Figure 1:
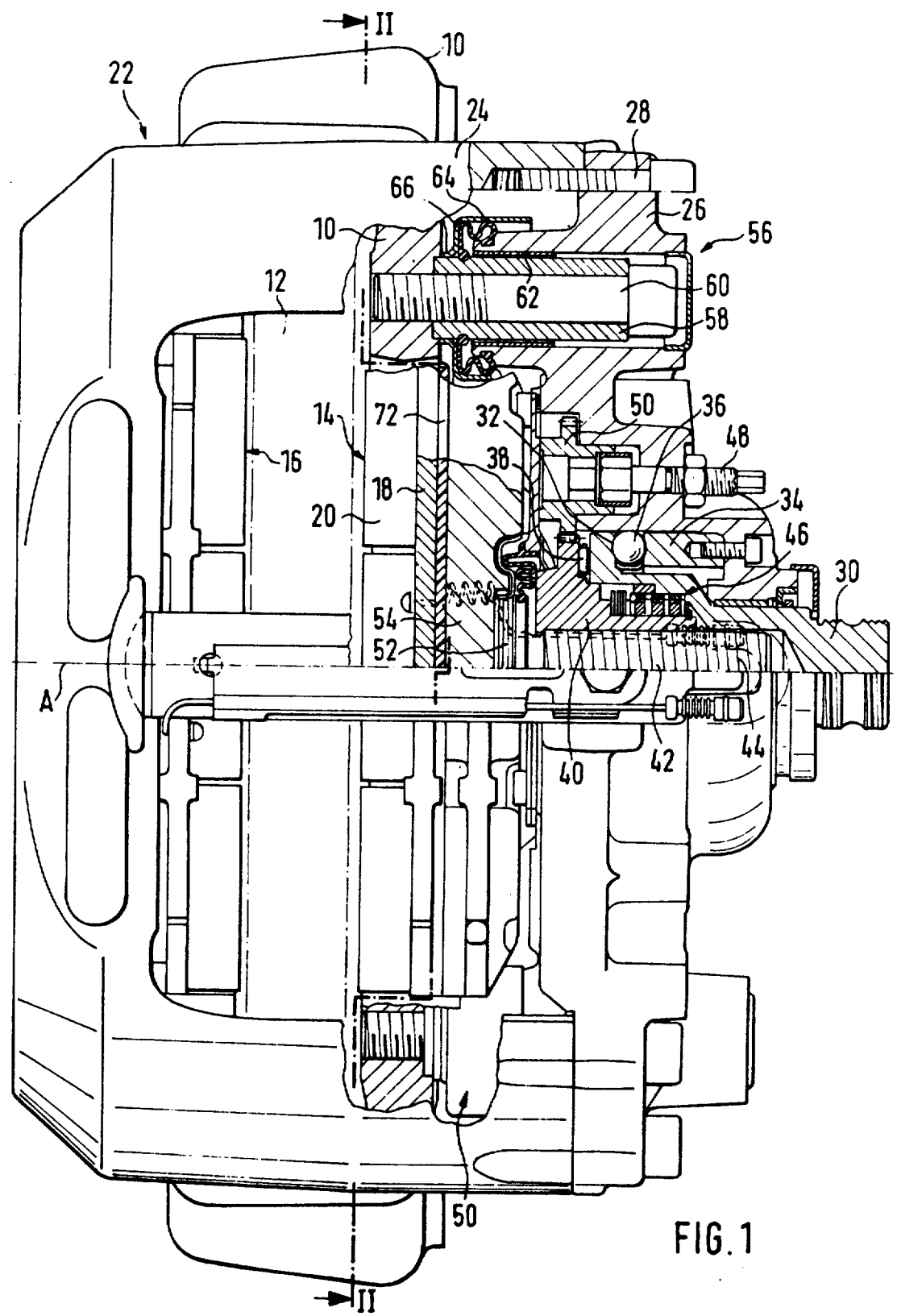

United States Patent [19]

Gockel et al.

[11] Patent Number: 5,090,520
[45] Date of Patent: Feb. 25, 1992

[54] SPOT-TYPE DISC BRAKE, INCLUDING A FLOATING CALIPER HAVING PRESSURE AND HEAT INSULATING PLATE

[75] Inventors: Harald Gockel, Bendorf; Bernd Röhling, Andernach, both of Fed. Rep. of Germany

[73] Assignee: Lucas Industries Public Limited Company, Birmingham, England

[21] Appl. No.: 533,517

[22] Filed: Jun. 5, 1990

[30] Foreign Application Priority Data

Jun. 12, 1989 [DE] Fed. Rep. of Germany ....... 3919179

[51] Int. Cl.⁵ .................. F16D 65/097; F16D 65/84; F16J 15/32
[52] U.S. Cl. .................. 188/73.45; 188/264 G; 277/212 FB
[58] Field of Search .............. 188/73.1, 73.34, 73.44, 188/73.45, 71.6, 264 G, 73.31, 370; 277/212 FB

[56] References Cited

U.S. PATENT DOCUMENTS

| | | | |
|---|---|---|---|
| 4,085,828 | 4/1978 | Thioux | 188/71.6 |
| 4,448,288 | 5/1984 | Delaunay | 188/73.45 |
| 4,611,694 | 9/1986 | Hickson et al. | 188/73.45 |
| 4,662,484 | 5/1987 | Adachi et al. | 188/73.45 |
| 4,754,854 | 7/1988 | Adachi et al. | 188/73.45 |

FOREIGN PATENT DOCUMENTS

| | | |
|---|---|---|
| 0248385 | 6/1987 | European Pat. Off. . |
| 1755977 | 12/1971 | Fed. Rep. of Germany ..... 188/73.1 |
| 2710719 | 9/1977 | Fed. Rep. of Germany ..... 188/73.1 |
| 3124527 | 1/1983 | Fed. Rep. of Germany . |
| 3601683 | 8/1986 | Fed. Rep. of Germany . |
| 3617846 | 12/1987 | Fed. Rep. of Germany . |
| 1072435 | 6/1967 | United Kingdom .............. 188/73.1 |
| 2026626 | 2/1980 | United Kingdom ............ 188/73.45 |
| 2125126 | 2/1984 | United Kingdom .......... 188/264 G |
| 2127918 | 4/1984 | United Kingdom .......... 188/264 G |
| 2160601 | 12/1985 | United Kingdom . |

*Primary Examiner*—Robert J. Oberleitner
*Assistant Examiner*—Alfred Muratori
*Attorney, Agent, or Firm*—Oblon, Spivak, McClelland, Maier & Neustadt

[57] ABSTRACT

A pair of caliper guides (56) are arranged at a brake carrier (10) in a manner so as to be protected from contamination by elastic boots (64). A floating caliper (22) is guided on the caliper guides (56) and straddles the brake disc (12) as well as a pair of brake pads (14,16). A tappet (42) is provided for brake actuation and is guided so as to be axially displaceable in the floating caliper (22) at one side of the brake disc (12). Its actuating forces are exerted through a pressure plate (54) on the adjacent brake pad (14). In the range of the caliper guides (56) the pressure plate (54) is formed with a recess (68) each in its edge for the corresponding elastic boot (64). The elastic boots (64) are covered by stiff, cup-shaped caps (66) engaging with radial clearance in a respective one of the recesses (68) formed in the edge of the pressure plate (54). A heat insulation plate (72) is positioned between the pressure plate (54) and the adjacent brake pad (41). It covers the recesses (68) in the edge of the pressure plate (54) at least in part. In this way the boots (64) are protected from becoming overheated.

4 Claims, 2 Drawing Sheets

SPOT-TYPE DISC BRAKE, INCLUDING A FLOATING CALIPER HAVING PRESSURE AND HEAT INSULATING PLATE

The instant invention relates to a spot-type disc brake, comprising a brake carrier with a pair of caliper guides arranged at the same in a manner protected from contamination by elastic boots, a pair of brake pads disposed at either side of a brake disc and each including a backplate with a friction lining secured to the same, a floating caliper guided in parallel with the axis of the brake disc on the caliper guides and straddling both the brake disc and the two brake pads, a brake actuating tappet guided for axial displacement in the floating caliper at one side of the brake disc, a pressure plate arranged in parallel with the brake disc between the tappet and the backplate of the adjacent brake pad to distribute actuating forces of the tappet to this brake pad and having a recess each in its edge in the area of the caliper guides for the respective elastic boot.

A spot-type disc brake of the kind described is known from EP 02 48 385 A1. The pressure plate covers essentially the same area as the brake pad against which it lies, leaving aside the recesses in its edge which are provided for the elastic boots of the caliper guides. The brake actuating tappet which is pressed against the pressure plate has a smaller end surface than the area of the pressure plate. Buckling of the pressure plate upon vigorous application of the brake is avoided by virtue of the rather considerable thickness which the pressure plate is given and which is greater than the overall thickness of the associated brake pad when its friction lining is new. The pressure plate thus presents a protective shield capable of withstanding high mechanical and thermal loads between the brake pad on which it acts and the tappet as well as other component parts of the brake actuating device. In spite of the fact that the elastic boots of the caliper guides are mounted quite well protected within the caliper and partly inside the recesses in the edge of the pressure plate, their lifetime has proved not to be entirely satisfactory if the brake was subjected to heavy wear in frequent, long-lasting braking operations.

It is, therefore, an object of the invention to develop a spot-type disc brake of the kind specified such that the elastic boots, and with them the caliper guides they are meant to protect, will enjoy an even longer service life, even under unfavorable conditions.

The object is met, in accordance with the invention, with a disc brake of the generic kind specified, in that the elastic boots are covered by stiff, cup-shaped caps fixed to a sleeve each of the corresponding caliper guide and engaging with radial clearance in one each of the recesses formed in the edge of the pressure plate, and that a heat insulation plate is disposed between the pressure plate and the backplate of the adjacent brake pad and at least partly covers the recesses in the edge of the pressure plate.

The invention is based on the finding that the pressure plate can radiate an unexpected amount of heat in radial outward direction by wall surfaces which define the recesses in its edge. Thus it may happen that the elastic boots suffer greater thermal stress after a braking operation than during the same. This is due to the fact that by its high thermal capacity, the pressure plate can prevent the contacting brake pad from overheating during braking and, therefore, radiating considerable quantities of heat toward the adjacent end surfaces of the elastic boots. The pressure plate itself, however, may reach a rather high temperature which is dissipated only very slowly after the braking operation if conditions are unfavorable, such as during standstill of the vehicle in question. This is due in large part to the fact that the pressure plate radiates heat in radial direction whereby the elastic boots may become overheated. As a consequence, those sectors of the elastic boots which are located in the recesses in the edge of the pressure plate may become brittle and then fail to be tight so that finally also the caliper guides themselves may suffer damage.

That is prevented, according to the invention, by two measures which are mutually supplementary. On the one hand, the elastic boots are shielded by the stiff cup-shaped caps not only from the adjacent brake pad but, what is more important, also from the pressure plate. This means that the elastic boots are prevented from making any contact with the pressure plate and are protected better than before from the influence of the heat of the pressure plate. Secondly, the pressure plate which itself is not heat-sensitive is prevented from being utilized in the usual and undesired manner as a thermal reservoir. Therefore, the pressure plate remains cooler and consequently is unable to radiate as much heat in radial direction to the elastic boots.

In a preferred embodiment of the invention the thermal insulation plate is made of a duroplastic material. It is especially convenient if the insulation plate is reinforced by embedding a fibrous material in it.

It is known with spot-type disc brakes comprising a floating caliper to provide an intermediate plate of thermally insulating material between the piston of an hydraulic actuating means and the adjacent brake pad, cf. for instance DE 37 42 737 A1. That intermediate plate may be fixed either at the end surface of the piston or at the backside, facing it, of a lining backplate, and it may also be designed to be the backplate itself. What is aimed at by that measure is a reduction of the thermal loading of the brake fluid. Caliper guides remain unaffected by the measure.

Figure 2:
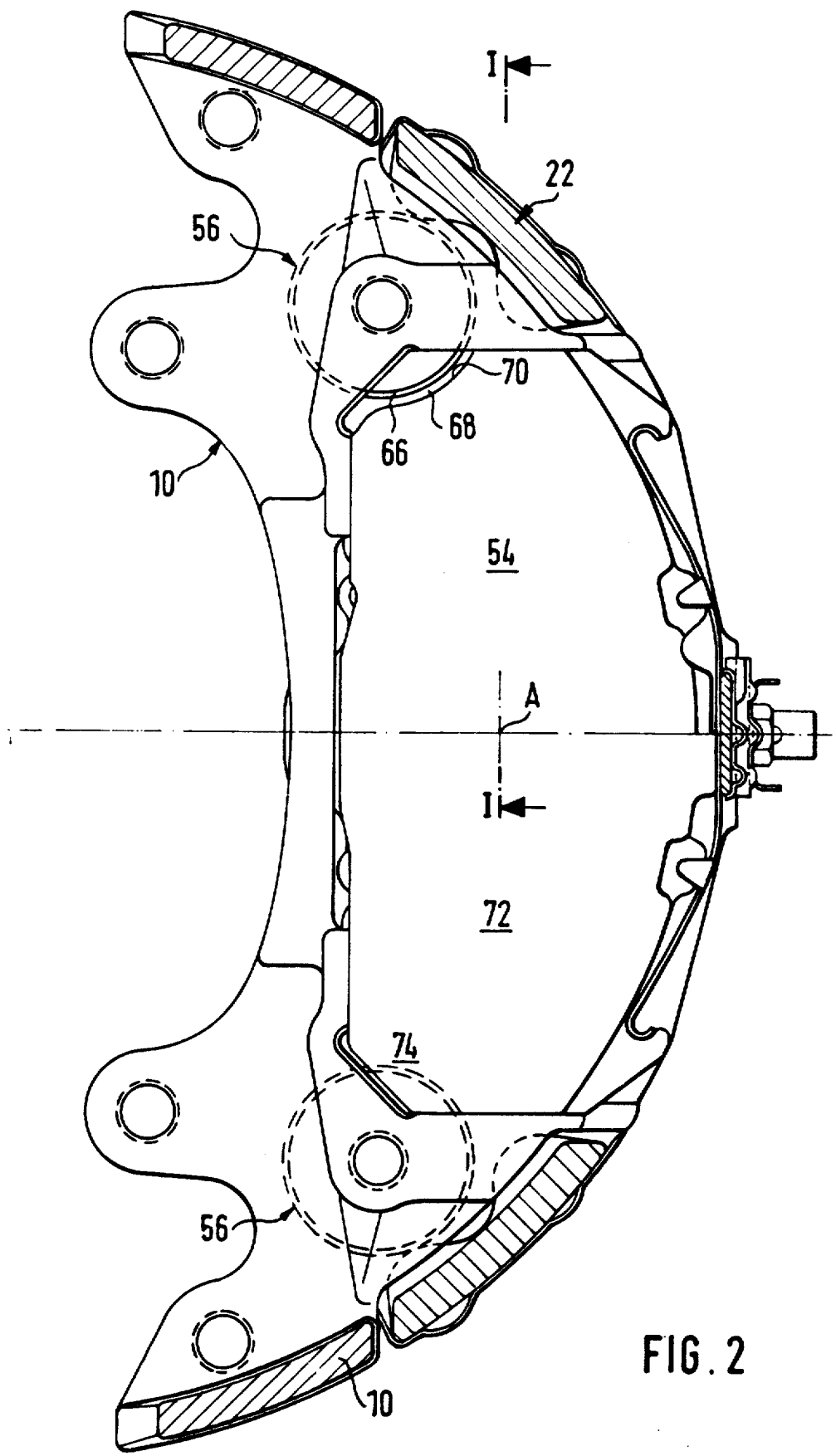

The invention will be described further, by way of example, with reference to the accompanying drawings, in which:

FIG. 1 is a top plan view of a disc brake according to the invention, shown partly in section 1—1 of FIG. 2, and FIG. 2 is a sectional view along line II—II of FIG. 1.

The disc brake shown comprises a brake carrier 10 which straddles a brake disc 12 and guides two brake pads 14 and 16 adapted to be engaged with one side each of the brake disc 12. Each brake pad 14 and 16 includes a backplate 18 and a friction lining 20 secured to the same. A floating caliper 22 straddling the brake disc 12 and the brake pads 14 and 16 comprises a bridge portion 24 and a housing portion 26, these two portions of the floating caliper 22 being firmly clamped together by screws 28. The bridge portion 24 houses a mechanical actuator of conventional type, including a bell-like shaft 30 formed with a first helical curve 32, a second helical curve 34 fixed in the housing portion 26, and roller bodies 36 arranged between the two curves 32 and 34 and assuring that the shaft 30, when being rotated in a certain direction, is shifted at the same time in the direction of its axis A toward the brake disc 12.

At its inner end surface, remote from the curve 32, the shaft 30 is supported through a needle bearing 38 on a spreader 40 in which a tappet 42 formed with an irreversible thread 44 is threadedly received. The shaft 30 further is connected to the spreader 40 by an automatic adjuster 46 which is of known design and, therefore, need not be explained here in greater detail. Another shaft 48 carrying a pinion 50 is supported in the housing portion 26 parallel to the shaft 30. The pinion 50 meshes with the spreader 40 so as to reset it into its starting position when the friction linings 20 are worn and before new brake pads 14 and 16 are installed.

The tappet 42 has a piston-like head piece 52 to transmit actuating forces to the brake pad 14 through a pressure plate 54. The outline of the pressure plate 54 is essentially the same as that of the backplate 18 of the friction lining 20, yet it is much thicker and therefore more resistant to bending. For this reason the pressure plate 54 is able to transmit centrally applied pressures from the tappet 42 substantially uniformly to the brake pad 14.

The floating caliper 22 is displaceable with respect to the brake carrier 10, in the direction of axis A, by a pair of caliper guides 56 in order to apply the other brake pad 16. The caliper guides 56 each include a sleeve 58 which is fastened to the brake carrier 10 by a screw 60 and guided in a journal bearing 62 in housing portion 26 of the floating caliper 22. Each caliper guide 56 is sealed by an elastic boot 64 of silicone rubber secured by one end at the housing portion 26 and by the other end at the sleeve 58. Each of these elastic boots 64 is enclosed by a rigid, cup-shaped cap 66 of thermoplastic material fastened near that end of the corresponding sleeve 58 which is secured to the brake carrier 10 and having circular shape in a section perpendicular to axis A, as may be seen from FIG. 2.

In the range of its two corners bordering on a respective one of the caliper guides 56, the pressure plate 54 is formed with a recess 68 each in its edge, each recess being defined by a wall surface 70 of circular arc configuration, coaxial with the corresponding caliper guide 56. There is sufficient clearance between each of these wall surfaces 70 and the outside wall of the protective cap 66 so that they cannot contact each other.

A heat insulation plate 72 of a duroplastic material with fiber inlay is positioned between the pressure plate 54 and the backplate 18 of the adjacent brake pad 14. The embedded fibrous material may be fiber glass or a mesh of synthetic filaments. The outline of the heat insulation plate 72 corresponds to that of the backplate 18 so that the pressure plate 54 can transmit brake actuating forces to the brake pad 14 through the heat insulation plate 72 over its full end surface area. The recesses 68 in the edge of the pressure plate 54 each are covered by a respective corner zone 74 of the heat insulation plate 72 so that the two protective caps 66 and the elastic boots 64 they enclose are protected against direct heat radiation from those parts of the backplate 18 in alignment with the recesses. The thermal transfer from the backplate 18 to the pressure plate 54 is reduced by the heat insulation plate 72 to such an extent that wall 70 zones of the pressure plate 54 likewise cannot radiate so much heat as to damage the protective caps 66 and/or the elastic boots 64.

What is claimed is:

1. In a spot-type disc brake comprising a brake disc rotatable about an axis, a floating caliper and a brake carrier; a pair of caliper guides each including a sleeve having an inner end engaging said carrier and an outer end remote from said carrier, an elastic boot between said caliper and the inner end of each of said sleeves to protect said guides from contamination, a pair of brake pads disposed at either side of said brake disc, each pad including a back plate with a friction lining secured thereto, said floating caliper being guided on said sleeves parallel with the axis of rotation of said brake disc and straddling both said brake disc and said pair of brake pads, a brake actuating tappet guided for axial displacement in said floating caliper at one side of said brake disc, and a pressure plate parallel with said brake disc and disposed between said tappet and the back plate of that brake pad on said one side of said brake disc to distribute brake actuating forces to that brake pad, said pressure plate having a recess in each of its edges that are in the regions of said caliper guides and of a size to receive therein the respective elastic boots at the inner ends of the respective sleeves of said guides, the invention comprising a stiff, cup-shaped cap carried by each of the respective sleeves adjacent its inner end and covering an elastic boot, each of said caps extending with clearance into a respective recess in said pressure plate, and a heat insulation plate disposed between said pressure plate and the back plate of the brake pad on said one side of said brake disc, said heat insulation plate extending to either side of said pressure plate to at least partly cover said recesses in the respective edges of said pressure plate.

2. In the spot-type disc brake as claimed in claim 1, wherein said heat insulation plate is made of a duroplastic material.

3. In the spot-type disc brake as claimed in claim 2, wherein said heat insulation plate is reinforced by fibrous material embedded therein.

4. In the spot-type disc brake as claimed in claim 1 wherein the shape of the heat insulation plate substantially corresponds to the shape of the back plate and the part of the insulation plate covering each of said recesses is in alignment with said back plate.

* * * * *